United States Patent
Degraeve et al.

(10) Patent No.: US 10,452,972 B2
(45) Date of Patent: Oct. 22, 2019

(54) HARDWARE IMPLEMENTATION OF A TEMPORAL MEMORY SYSTEM

(71) Applicant: IMEC VZW, Leuven (BE)

(72) Inventors: Robin Degraeve, De Pinte (BE); Dimitrios Rodopoulos, Leuven (BE)

(73) Assignee: IMEC vzw, Leuven (BE)

( * ) Notice: Subject to any disclaimer, the term of this patent is extended or adjusted under 35 U.S.C. 154(b) by 103 days.

(21) Appl. No.: 15/650,749

(22) Filed: Jul. 14, 2017

(65) Prior Publication Data
US 2018/0046899 A1    Feb. 15, 2018

(30) Foreign Application Priority Data

Jul. 18, 2016  (EP) .................... 16180038

(51) Int. Cl.
*G06F 12/02* (2006.01)
*G06N 3/04* (2006.01)
(Continued)

(52) U.S. Cl.
CPC ......... *G06N 3/049* (2013.01); *G06F 12/0207* (2013.01); *G06N 3/0445* (2013.01);
(Continued)

(58) Field of Classification Search
None
See application file for complete search history.

(56) References Cited

PUBLICATIONS

Fan et al., "Hierarchical Temporal Memory Based on Spin-Neurons and Resisitive Memory for Energy-Efficient Brain-Inspired Computing", *IEEE Transactions on Neural Networks and Learning Systems*, vol. 27, No. 9, Sep. 2016, pp. 1907-1919.
(Continued)

*Primary Examiner* — Yong J Choe
(74) *Attorney, Agent, or Firm* — Knobbe, Martens, Olson & Bear LLP

(57) ABSTRACT

A hardware implementation of a temporal memory system is disclosed. One aspect includes at least one array of memory cells logically organized in rows and columns, wherein each of the memory cells is adapted for storing a scalar value and adapted for changing the stored scalar value. The hardware implementation additionally includes an input system adapted for receiving an input frame as input and for creating a representation for the input, where the input comprises information for addressing the memory cells in the at least one array. The hardware implantation additionally includes at least one addressing unit for identifying a memory cell in the at least one array with a row address and a column address. The at least one addressing unit includes a column addressing unit for receiving the representation or a derivative thereof as input and applying the representation or the derivative as a column address to the array of memory cells, and a row addressing unit for receiving a delayed version of the representation at a specified time in the past as input, and applying this representation as a row address to the array of cells. The hardware implementation further includes a reading unit adapted for reading out scalar values from a selected row of memory cells in the array, based on the row address applied, wherein each scalar values read out by the reading unit corresponds to a likelihood of temporal coincidence between the input representation of the row address and the input representation of the column address, the likelihood being adjustable through the scalar value stored in the memory cell.

13 Claims, 8 Drawing Sheets

(51) Int. Cl.
  *G06N 3/08* (2006.01)
  *G06N 3/063* (2006.01)
(52) U.S. Cl.
  CPC ......... *G06N 3/0472* (2013.01); *G06N 3/0635* (2013.01); *G06N 3/08* (2013.01); *G06F 2212/1016* (2013.01); *G06N 3/0454* (2013.01)

(56) References Cited

PUBLICATIONS

"GitHub—numenta/nupic: Numenta Platform for Intelligent Computing"; https://github.com/numenta/nupic; in 3 pages, downloaded on Sep. 13, 2017.
"Hierarchical Temporal Memory including HTM Cortical Learning Algorithms", *Numenta*; Version .02.1; Sep. 12, 2011; 68 pages.
"Master Thesis and Internship Projects @ imec", Feb. 18, 2016; 8 pages.
Neftci et al., "Event-Driven Contrastive Divergence for Spiking Neuromorphic Systems", Dec. 10, 2013; 22 pages.
Smith James E., "A Study of Branch Prediction Strategies", *IEEE*; 1981; pp. 135-148.
Tang et al., "Spiking Neural Network with RRAM: Can We Use It for Real-World Application?", *Design, Automation & Test in Europe Conference & Exhibition (DATE)*; 2015; pp. 860-865.
Wu et al., "Probabilistically Programmed STT-MRAM", *IEEE Journal on Emerging and Selected Topics in Circuits and Systems*; vol. 2, No. 1, Mar. 2012; pp. 42-51.

HARDWARE IMPLEMENTATION OF A TEMPORAL MEMORY SYSTEM

CROSS-REFERENCE TO RELATED APPLICATIONS

This application claims foreign priority to European Patent Application No. EP 16180038.8, filed on Jul. 18, 2016, content of which is incorporated by reference herein in its entirety.

BACKGROUND

Field

The disclosed technology generally relates to memory systems, and more particularly to temporal memory systems which enable pattern identification and prediction.

Description of the Related Technology

Temporal memories systems refer to memory systems that produce an output based on a time series of input data received by the systems. One traditional example is referred to as the branch predictor (e.g., https://courses.cs.washington.edu/courses/cse590 g/04sp/Smith-1981-A-Study-of-Branch-Prediction-Strategies.pdf), which can be used to predict an outcome of a branch instruction in a computer pipeline, based on previous outcomes of similar branch instructions. In that sense, branch predictors are naive versions of temporal memories, given that they enable prediction of a branch instruction outcome. In a specific variant of the branch predictor, called hierarchical branch predictors, the prediction correctness is compared between different predictors and the most successful one is used to create a prediction about the handled branch instruction outcome.

As stated above, a temporal memory refers to a memory system that identifies and predicts input data, based on the sequence of data that has been submitted to it up to a specific point in time. Naturally, certain sequences of input favour specific predictions or lead to the detection of specific patterns in the streaming input of the temporal memory. A mathematical construct that has been used to encapsulate the transition between specific states and the probability of such transition is referred to as Markov chain. This is typically visualized as a graph the vertices of which represent states and the links are weighted by the transition probability between said states.

In the technological area of pattern recognition and prediction inference, the concept of hierarchical temporal memories (HTM) has been developed, which is a brain-inspired neuromorphic network that uses data representations, for instance sparsely distributed data representations, for storing and computing sequences of data. Based on the operating principles of the neocortex, this concept has been developed for learning and recognition of quantized patterns. A software implementation of this concept has been publicly disclosed by Numenta, an overview of which can be seen in a respective white paper (e.g., http://numenta.org/resources/HTM_CorticalLearningAlgorithms.pdf).

Numenta has additionally disclosed principles of cortical learning algorithm (CLA), which is used to train the hierarchical temporal memory with a continuous stream of input data. The CLA includes two parts: a spatial pooler that converts sensory input data into a sparse bit representation, and a temporal pooler that can learn and predict sequences of data using the sparse bit representation. A software version of Numenta's HTM is publicly available (e.g., https://github.com/numenta/nupic). Hardware implementations of the HTM concept have also been attempted. A paper by University of Illinois at Urbana Champagne (UIUC) attempts to use spatial and temporal pooler concepts described above with a combination of NVM elements (e.g., http://dx.doi.org/10.1109/TNNLS.2015.2462731). Even though a temporal grouping of spatially pooled inputs is disclosed in the hardware implementation detailed in the UIUC paper, the hardware implantation lacks an aspect of time series prediction, based on the inputs provided to the HTM.

SUMMARY OF CERTAIN INVENTIVE ASPECTS

It is an object of embodiments of the disclosed technology to provide a more efficient way of implementation of a temporal memory system.

The above objective is accomplished by a device and a method according to the disclosed technology directed to temporal memory systems which enable pattern identification and prediction based on a streaming input that is fed to them in a continuous way. In particular embodiments, the disclosed technology relates to learning algorithms that can be used to train a temporal memory with a continuous stream of input data. In particular embodiments, non-volatile memory (NVM) elements may be used as building blocks of such temporal memory systems.

In comparison to the above samples of prior art, the current disclosure describes a device and system that uses memory cells, for instance, but not limited thereto, NVM memory cells, each memory cell comprising at least one memory cell element, to enable pattern identification and prediction, based on a sequence of input frames that have been fed to the system. As such:

1) it differentiates from a traditional branch predictor, possibly in the use of NVM elements, but also in the storage of temporal patterns of arbitrary input data in said elements; and
2) it differentiates from the HTM concept and its implementations (be that software or hardware), since a future input prediction is not conditional to the spatial or temporal pooling of input data but is solely based on the mimicking of synaptic connections between input symbols at different temporal contexts.

In a first aspect, the disclosed technology provides a hardware implementation of a temporal memory system. The hardware implementation comprises: at least one array of memory cells logically organized in rows and columns, each memory cell being adapted for storing a scalar value and adapted for changing, e.g. for incrementing or decrementing, the stored scalar value, an input system adapted for receiving an input frame as input and for creating a representation for that input, which is fit for memory cell addressing in the at least one array, at least one addressing unit for identifying a memory cell in the at least one array with a row address and a column address, the at least one addressing unit comprising a column addressing unit for receiving the representation or a derivative thereof as input and applying the representation or the derivative as a column address to the array of cells, and a row addressing unit for receiving a delayed version of the representation at a specified time in the past as input, and applying this representation as a row address to the array of cells, at least one reading unit adapted for reading out scalar values from a selected row of memory cells in the at least one array, based on the row address applied, each read out scalar value corresponding to a likelihood of temporal coincidence between the input representation of the row address and the input representation of the column address, this likelihood being adjustable through the scalar value stored in the memory cell.

It is an advantage of embodiments of the disclosed technology that it solves the lack of availability of hardware implementation of a temporal memory system. The disclosed technology provides a very efficient way of implementation, as it can be implemented with readily-known types of elements. The provided hardware implementation enables the development of an entire new class of neuromorphic chips.

It is an advantage of a hardware implementation of the temporal memory system according to embodiments of the disclosed technology that it hardcodes in its memory cells the likelihood of occurrence of sequences of abstract symbols. The scalar values stored in the memory cells express the likelihood of temporal coincidence between a currently observed frame (N) and a previously observed frame (N−k), where k≥1.

In a hardware implementation according to embodiments of the disclosed technology, a specified time in the past is corresponding to a predetermined number of frames before a current input frame. The hardware implementation may furthermore comprise a buffering unit for implementing a first-in-first-out (FIFO) queue with a pre-determined depth for storing a given number of representations of previous input frames. The representation of the previous input frames may be obtained from reading out the array of memory cells. As such, the FIFO may be adapted for holding a sequence of consecutive previously read out sparsified representations of input frames.

In embodiments of the disclosed technology, the first-in-first-out (FIFO) queue may furthermore comprise a shifting unit, adapted for enqueuing a row address to the FIFO. This allows to fill the FIFO with relevant data, to be used during processing of transitions of frames, or during prediction of occurrence of a next frame.

In the hardware implementation according to embodiments of the disclosed technology, the reading unit may comprise a selection unit for selecting a scalar value based on a criterion, and its corresponding addresses.

In the hardware implementation according to embodiments of the disclosed technology, the at least one array may be a square array.

In a hardware implementation according to embodiments of the disclosed technology, the memory cells may be adapted for supporting three operations: read scalar value, increment scalar value, for instance by a set operation on a RRAM element, and decrement scalar value, for instance by a reset operation on a RRAM element.

In a hardware implementation according to embodiments of the disclosed technology, the addressing unit may be adapted for identifying one or more memory cells in the at least one array prior to implementing any of a read operation, an increment operation or a decrement operation.

In a hardware implementation according to embodiments of the disclosed technology, the input system may comprise a block-level input unit adapted for receiving partitioned input from an input unit, and for transforming this partitioned input into a representation fit for memory cell addressing in the at least one array. The input representation corresponds to the dimensions of the at least one array.

In a hardware implementation according to embodiments of the disclosed technology, the memory cells may include non-volatile memory cells. In particular elements, each memory cell or the at least one array includes one or more of any of RRAM cells, e.g. stochastic RRAM (resistive random-access memory) cells, filamentary RRAM cells, OXRAM (oxide-based resistive memory RAM) cells, CBRAM (conductive bridging RAM) cells, VMCO (vacancy-modulated conductive oxide) RAM cells, PMC cells (programmable metallization cells); PCM (phase-change memory) cells; SRAM (static random-access memory) cells; flash cells; floating gate cells; or MRAM (magnetoresistive random-access memory) cells, such as for instance STT (spin-transfer torque) MRAM cells or SOT (spin orbit torque) MRAM cells, SONOS (silicon-oxide-nitride-oxide-silicon) cells.

The use of filamentary RRAM cells is particularly advantageous. The working principle of filamentary RRAM cells includes increasing the conductivity, e.g., by growing, and decreasing the conductivity, e.g., by shrinking, a narrow conductive filament in the RRAM cells by applying a voltage of different polarity and/or magnitude. This growing and shrinking of the conductive filament may mimic growth and removal of synaptic connections in a biological brain. The use of filamentary RRAM allows for a single chip solution rather than a full computer with extended memory which may be useful to mimic the brain-inspired operation through software. OxRAM cells are particularly useful because they can reinforce the filament generation.

In alternative embodiments, the memory cells may include volatile memory cells, such as for instance DRAM cells.

In particular embodiments of the disclosed technology, the memory cells may be of the type single selector, single storage element. A 1Transistor-1Resistor (1T1R) implementation of a memory cell with RRAM memory elements is well-known in the art. A 1T1R crossbar (Xbar) can be implemented. In such implementation, the context of a learned sequence is converted into a 2D pattern of filament connections in a 2D crossbar cell array.

In a second aspect, the disclosed technology provides a method for processing the transition of a first frame to a second frame in a system comprising at least one array of memory cells logically organized in rows and columns. Each memory cell is adapted for storing a scalar value and for changing, e.g. incrementing or decrementing, the stored scalar value. The method comprises:

(a) obtaining a representation of the first frame, and applying the representation of the first frame as a row address to the array of memory cells, (b) obtaining a representation of the second frame, and applying the representation of the second frame as a column address to the array of memory cells, (c) reading all memory cells, addressed by the row and column addresses, and identifying the one that satisfies a selection criterion, if such cell is available, or choosing an arbitrary addressed memory cell if none of the addressed cells satisfies the selection criterion, and performing an incrementing or decrementing operation on the scalar value of the identified or chosen memory cell, and (d) sparsifying the representation of the second frame based on the result of the previous reading step.

A method according to embodiments of the disclosed technology may furthermore comprise signalling an anomaly event if none of the read memory cells satisfies the selection criterion at step (c).

In embodiments of the disclosed technology, reading a memory cell may include reading a scalar value stored in the memory cell, and identifying a memory cell that satisfies the selection criterion may include testing the read scalar value. Testing the read scalar values may for instance be done via comparison with a threshold on current or resistance or voltage.

In a method according to embodiments of the disclosed technology, the representation of the first frame may be a sparse data bit string comprising only one logically high bit or only one logically low bit.

In a third aspect, the disclosed technology provides a method for predicting a representation of a next frame based on a current frame in a system comprising at least one array of memory cells logically organized in rows and columns. Each memory cell is adapted for storing a scalar value and for changing, e.g. incrementing or decrementing, the stored scalar value. The method comprises:
- (a) obtaining a representation of the current frame, and applying the representation of the current frame as a row address to the array of memory cells,
- (b) reading all memory cells, addressed by the row address, and identifying the ones that satisfy a selection criterion, if such are available, the column address of these cells being the predicted representation of the next frame.

A method according to the third aspect of the disclosed technology may furthermore comprise
- (c) obtaining an actual representation of the next frame, and
- (d) comparing the predicted representation of the next frame with the actual representation of the next frame, and signalling a misprediction in case a mismatch is identified.

In a fourth aspect, the disclosed technology provides the use of at least one array of memory cells logically organized in rows and columns, for implementing a hardware implementation of a temporal memory system for processing or predicting the transition of a first frame to a second frame. Each memory cell in the array is adapted for storing a scalar value and for changing, e.g. incrementing and/or decrementing, the stored scalar value, the scalar value corresponding to a likelihood of temporal coincidence between a input representation of the first frame applied as a row address to the array, and the column address, this likelihood being adjustable through the scalar value stored in the memory cell.

In embodiments of the disclosed technology, an input representation of the second frame may be applied as a column address to the array, wherein an increment or decrement operation is applied to the scalar value of a memory cell each time it is addressed by a row address and a column address.

In particular embodiments of the disclosed technology, row addresses and column addresses may be sparse bit strings, for instance comprising only one logically high bit or only one logically low bit.

It is an advantage of a hardware implementation of a temporal memory system that it provides the ability to create associations of learned patterns.

It is an advantage of a hardware implementation of a temporal memory system that it enables the fabrication of a new class of neuromorphic chips. It can be used as a hardware accelerator.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The disclosed technology will now be described further, by way of example, with reference to the accompanying drawings, in which.

Figure 1:
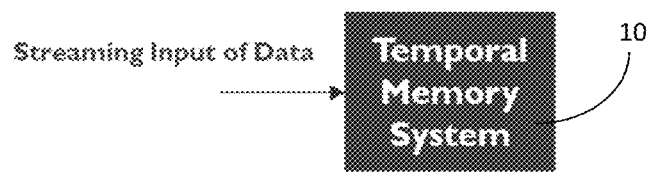
FIG. 1 represents a high-level representation of a temporal memory system according to embodiments of the disclosed technology.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF CERTAIN ILLUSTRATIVE EMBODIMENTS

The disclosed technology will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, directional terminology such as top, bottom, front, back, leading, trailing, under, over and the like in the description and the claims is used for descriptive purposes with reference to the orientation of the drawings being described, and not necessarily for describing relative positions. Because components of embodiments of the disclosed technology can be positioned in a number of different orientations, directional terminologies are used for purposes of illustration only, and are in no way intended to be limiting, unless otherwise indicated. It is, hence, to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

Definitions

In accordance with the disclosed technology, a hardware implementation of a temporal memory system is provided. This hardware implementation comprises at least one array of memory cells, where each memory cell comprises at least one memory cell element. The memory cells may be, but do not need to be, non-volatile memory cells, comprising non-volatile memory cell elements. Alternatively, memory cells may comprise or consist of one or more volatile memory cell elements.

In particular embodiments of the disclosed technology, the memory cell elements may include RRAM (resistive random access memory) elements. RRAM technology has been developed as an alternative memory technology. One particular type of RRAM which may be used in embodiments of the disclosed technology is filamentary-based RRAM. Without being bound to any theory, in operation, a filamentary-based RRAM can switch between states by growing and shrinking a narrow conductive filament in response to applied voltages of different polarity and magnitude. Embodiments of the disclosed technology may use one or more of oxygen vacancy-based RRAM (OXRRAM, or RRAM with conductive filament formed by or of oxygen vacancies), metal ion-based filamentary RRAM (conductive bridge RAM or CBRAM with filament formed by or of metal ions), vacancy-modulated conductive oxide resistive RAM (VMCO RRAM) or phase-change memory (PCM). In addition, magnetoresistive random-access memory (MRAM) cells can be used. Furthermore, spin-transfer torque magnetic RAM (STT-MRAM) or spin orbit torque magnetic RAM (SOT MRAM) could be used. An advantage of SOT MRAM includes the capability of the resistance levels to be fine-tuned.

In alternative embodiments, statistic random-access memory (SRAM), FLASH or floating gate memory devices can be used as memory cell elements. Also silicon-oxide-nitride-oxide-silicon (SONOS) and dynamic random-access memory (DRAM) can be used.

In accordance with some embodiments of the disclosed technology, the memory cells are probabilistic devices. This means that when given a stimulus, e.g. a pulse with a duration t (seconds) and an amplitude V (volts), the response will be probabilistic, i.e. there are multiple possible outcomes, each having varying degrees of certainty of occurrence. In particular, starting from an OFF state, stimuli, e.g. voltage and time thereof, can be chosen such that the probability for getting to an ON state can be pre-determined.

As described herein, the memory cells are referred to be "logically organised in rows and columns" in an array. Throughout this description, the terms "horizontal" and "vertical" (related to the terms "row" and "column", respectively) are used to provide a co-ordinate system and for ease of explanation only. They do not need to, but may, refer to an actual physical direction of the device. Furthermore, the terms "column" and "row" may be used to describe sets of array elements which are linked together. The linking can be in the form of a Cartesian array of rows and columns; however, the disclosed technology is not limited thereto. As will be understood by those skilled in the art, columns and rows can be easily interchanged and it is intended in this disclosure that these terms be interchangeable. Also, non-Cartesian arrays may be constructed and are included within the scope of the invention. Accordingly the terms "row" and "column" should be interpreted broadly. To facilitate in this broad interpretation, the claims refer to logically organised in rows and columns. By this is meant that sets of memory cells, e.g. RRAM cells, are linked together in a topologically linear intersecting manner; however, that the physical or topographical arrangement need not be so. For example, the rows may be circles and the columns radii of these circles and the circles and radii are described in this invention as "logically organised" in rows and columns. It should be understood that this terminology is used only to facilitate a better understanding of the specific structure being described, and is in no way intended to limit the invention.

A "scalar value" in the context of the disclosed technology refers to a single value, as opposed to a data structure, like a vector or a matrix which contain a plurality of values. The scalar value can be binary (only two levels: "logical high" or "logical low"), or it can be a multi-level. If the scalar value is of a multi-level type, each of the levels is distinguishable from the others.

"Sparse data" in the context of the disclosed technology refers to data with a limited number of digits of a particular value. Typically, sparse data may for instance have only one or only a few "1" (logically high) bits, where data processing is based on these "1" bits. This, however, is not limiting to the disclosed technology, and in alternative embodiments inverse implementations could be provided, where data only has one or a few "0" (logically low) bits, and where the further processing is done on the "0" bits. For the sake of convenience, in what follows reference is made to situations where the sparse data only contains a limited amount of "1" bits, this way of explaining not being intended to be limiting for the disclosed technology.

Temporal Memory System—Implementation

A temporal memory system 10, as illustrated schematically in FIG. 1, is a building block of the disclosed technology. The temporal memory system 10 is configured to receive a streaming input of data from any source. The streaming input of data includes a sequence of frames, where each partition of the streaming input is referred to herein as a single frame (thus, the stream comprising a temporal sequence of frames).

The temporal memory system 10 according to embodiments of the disclosed technology learns transitions of frames in a sequence in a context of a continuous stream of such frames. It is an object of embodiments of the disclosed technology to predict what frame is most likely to appear in the input stream of the system. It is an advantage of embodiments of the disclosed technology that this can be done with reduced power consumption.

The temporal memory system 10 comprises at least one array of memory cells, for instance, but not limited thereto, non-volatile memory cells, where each memory cell comprises at least one memory cell element. In embodiments of the disclosed technology, memory cells can contain a plurality of, e.g. two or more, memory cell elements.

The implementation of the temporal memory system 10 according to embodiments of the disclosed technology can be different, depending on the type of memory cells and memory cell elements used. For instance, the implementation in RRAM technology may comprise a one-transistor-one-resistor (1T1R) type crossbar array, as laid out schematically in FIG. 2. The array may be a rectangular or a square array, for instance an array of $(L \times M)^2$ memory cells, where M and L can be the same or different and are further described in the DETAILED DESCRIPTION and OPERATIONAL DESCRIPTION parts of the current disclosure.

Figure 2:
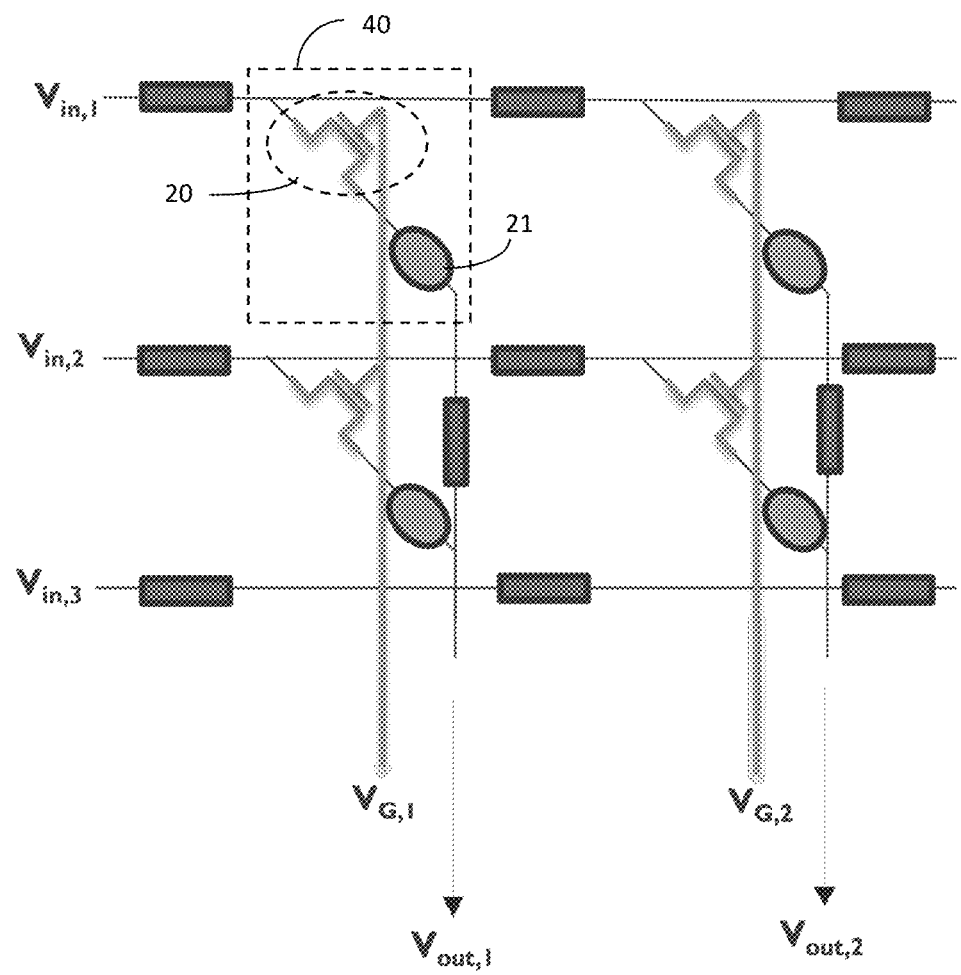
FIG. 2 schematically illustrates a RRAM implementation of an array of memory cells for use in a temporal memory system according to embodiments of the disclosed technology.

FIG. 2 illustrates part of an array of memory cells, in particular it illustrates four memory cells 40. Each illustrated memory cell 40 comprises a selector element 20 and a storage element or memory cell element 21. The memory cells 40 are logically organised in rows and columns. The array is provided with row lines and with column lines. In the embodiment illustrated, the array is provided with one row line per row, and two column lines per column. The row lines are row addressing lines for addressing memory cells in a row. One set of column lines are column addressing lines, for addressing memory cells in a column. The other set of column lines are output lines, for allowing readout content of memory cells addressed by means of the row addressing lines and column addressing lines.

Detailed Description—Structure

According to the disclosed technology, the context of a learned sequence is converted into a two-dimensional pattern of connections via the memory cells, e.g. filament connections in case filamentary RRAM is used as memory cell elements. In one embodiment, the temporal memory is implemented by making a crossbar array of memory cell elements, e.g. filamentary RRAM elements. The array contains, in the memory cell elements, stored information about the strength of connection between rows and columns. In this hardware implementation, an interconnect matrix is provided, where the interconnections are formed by the memory cells. The connectivity is stored in the memory cell elements. The hardware implementation, if looked at from a higher level, comprises at least one array of memory cells, in which memory cell elements store connectivity information between two frames (i.e. the chance that a first frame goes over into a second frame) as a likelihood value, which can, for instance, be the strength of the connection, or the time duration a connection lasts. As one example, when implemented in RRAM memory cells, the strength of the connection can be correlated with the conductivity of the memory cells, which can in turn be correlated with the conductivity of the filaments formed in the memory cells.

Furthermore, according to the disclosed technology, registers and basic logic functions can be used to orchestrate the operation of this temporal memory system, e.g. non-volatile temporal memory system. Preferably, although not required, information is sparsely stored. The proposed logic enables use of the array of memory cells for training and prediction. The exact way of driving row addressing lines, column addressing lines and output lines in the array of memory cells is described below.

Figure 3:
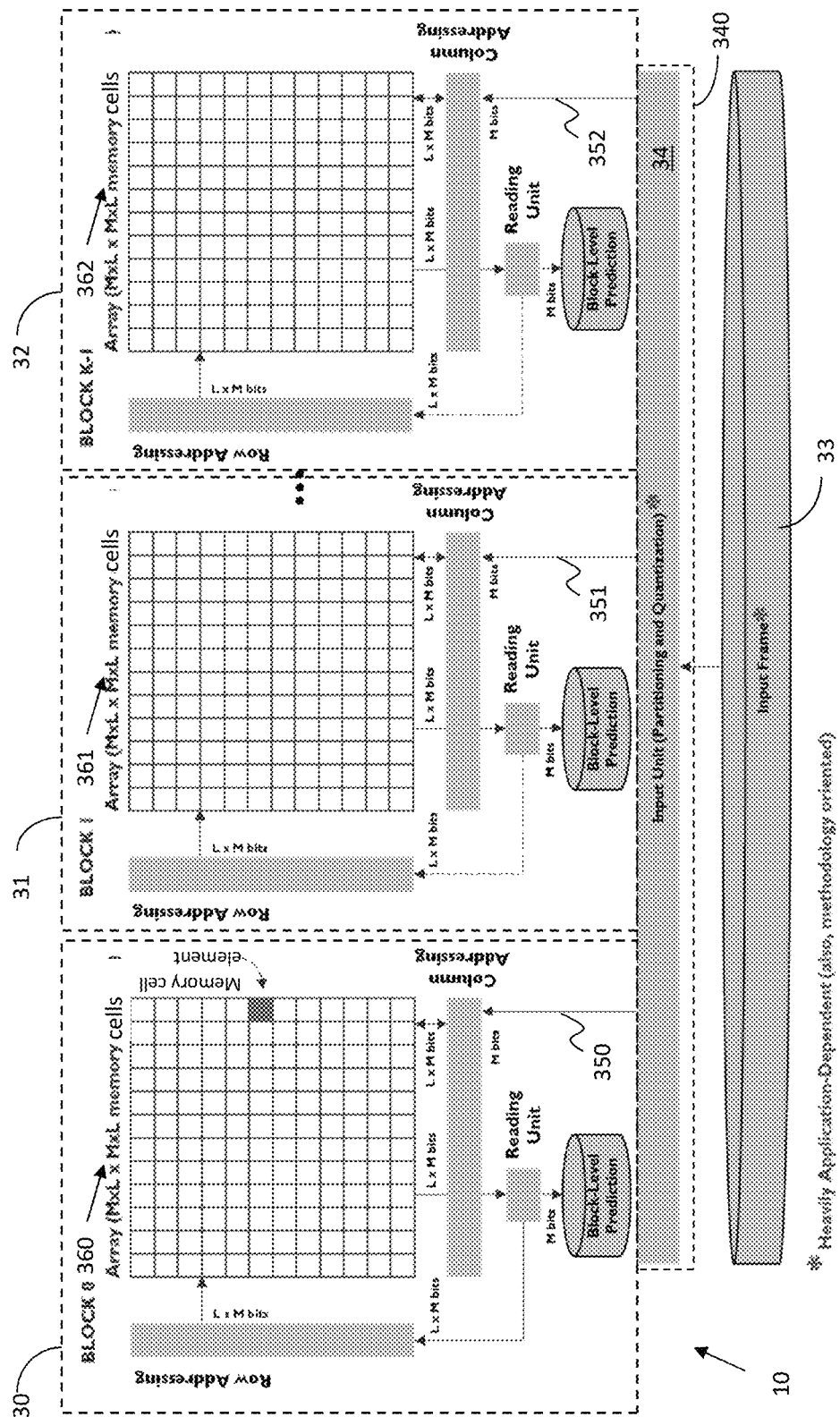
FIG. 3 is a schematic overview of a hardware implementation of a temporal memory system according to embodiments of the disclosed technology.

FIG. 3 gives a schematic overview of a hardware implementation of a temporal memory system 10, according to embodiments of the disclosed technology. The hardware implementation comprises a plurality of sub-systems 30, 31, 32, also referred to as blocks. The hardware implementation is suitable and adapted for handling a stream or sequence of input frames 33, and for predicting therefrom future input frames. In accordance with embodiments of the disclosed technology, this is enabled by partitioning and quantizing the input frame into block-level inputs, which are then processed individually and in parallel to produce block-level predictions.

An input frame 33 is an arbitrary data structure (e.g. a bundle of signal values, image frames, sensor data, etc.), instances of which are fed to the system 10 (and are processed) in a streaming fashion (the one after the other).

The goal of a temporal memory system 10 according to embodiments of the disclosed technology is to be able to produce predictions about future frames.

At the input of the system 10, an input unit 34 is provided. The input unit 34 is adapted for receiving input data (an input frame 33) from a data stream (sequence of input frames), and for creating a representation therefor. The representation of the input data is a sequence of logical high and low values (e.g. 0 and 1).

The input unit 34 partitions the representation of the input frame 33 and quantizes the information contained in each partition. The result of this process is a bundle of block-level inputs 350, 351, 352, each one submitted to each block 30, 31, 32 of the system 10 for future processing. A block-level input 350, 351, 352 is a result of quantizing a subset of the information found in the representation of the input frame 33. It is a bit string with M bits, only 1 of which is being equal to 1.

Each of the blocks 30, 31, 32 of the system 10 comprises a memory cell array 360, 361, 362, with supporting circuitry to orchestrate their access and read/write patterns so that a block-level prediction can be produced. The supporting circuitry may comprise a block-level input unit, row and column addressing circuitry, a reading unit, a delay element and storage means for storing prediction data, as illustrated in more detail elsewhere in this specification with respect to FIG. 9. Blocks 30, 31, 32 operate fully independently and in parallel, so in the remainder of the disclosure the structure and operation of only a single block (for the sake of brevity) will be dealt with, the structure and operation of the blocks 30, 31, 32 being similar.

In the schematic illustration of FIG. 3, only three blocks are shown, but this is a general representation for K blocks being present. The K blocks may for instance be up to 1024 blocks, or even higher, depending on the application.

Figure 4:
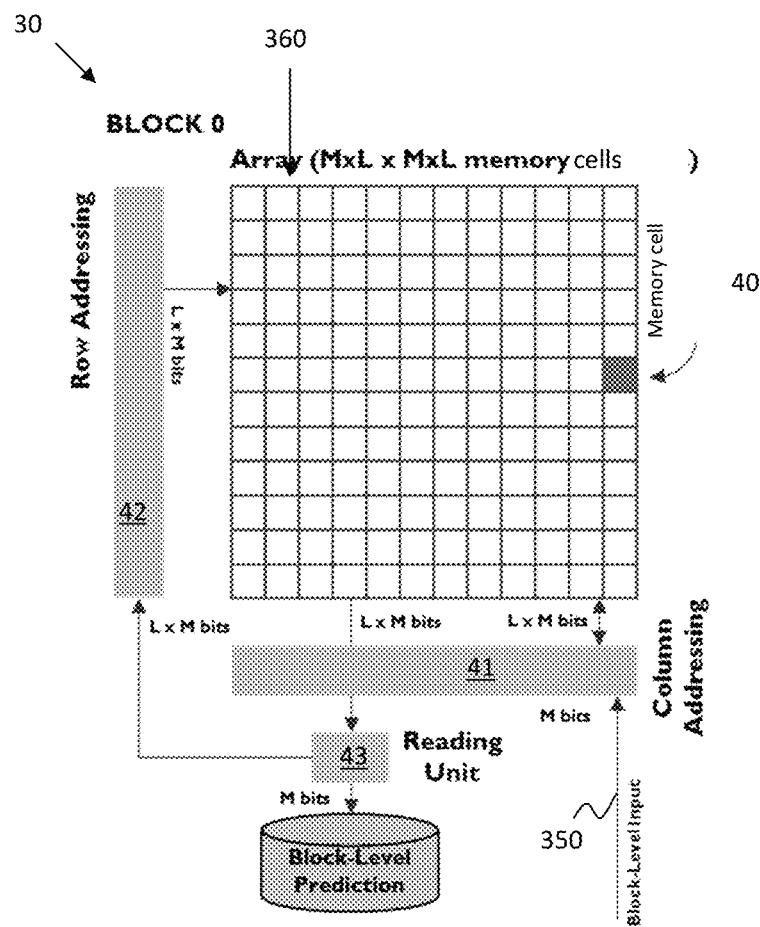
FIG. 4 is a schematic overview of a building block of a hardware implementation of a temporal memory system as illustrated in FIG. 3.

FIG. 4 schematically represents an overview of a block of the hardware implementation of a temporal memory system 10 as illustrated in FIG. 3. For instance, FIG. 4 shows the block 30 in FIG. 3. A single block of the system 10 can perform all the learning and prediction operations independently of all other blocks, based on block-level input that originates from the input frame 33 to the entire system 10, and can be a part of the representation thereof.

Block 30 comprises an array 360 of memory cells 40, logically organized in rows and columns. Each memory cell 40, more particularly the at least one memory cell element thereof, for instance memory cell element 21 as illustrated in FIG. 2, is adapted for storing a scalar value and for changing, for instance incrementing or decrementing, the stored scalar value. The memory cells 40, more particularly the memory cell elements, can be changeable, e.g. it can be incrementable. The incrementation may be done in any suitable way, for instance in a linear way, a logarithmic way, or an exponential way to name a few. The memory cell elements are thus multi-level storage devices, including but not limited to binary storage devices. The memory cell elements may be stable non-volatile memory elements; which keep their content for a predefined time, whereby the time of stability is determined depending on the applications where the array is used. In some embodiments, the memory cell elements are symmetrical in reading and writing.

In some embodiments, the memory cell elements include filamentary RRAM elements, of which a resistance value can be read. Embodiments of the disclosed technology may use oxygen vacancy-based RRAM (e.g., OXRRAM, or RRAM with conductive filament made of oxygen vacancies), or metal ion-based filamentary RRAM (e.g., conductive bridge RAM with filament formed by or of metal ions). The disclosed technology is, however, not limited thereto. Alternatively, the memory cell elements may be STT MRAM device, of which resistance may be read, according to the magnetization direction of the MRAM device. Other examples are described above, and are not repeated here for sake of brevity.

The block 30 of the hardware implementation of the temporal memory system 10 further comprises an addressing unit for identifying a memory cell 40 in the array 360 with a row address and a column address. The addressing unit comprises a column addressing unit 41 and a row addressing unit 42.

The block-level input 350 received from the input unit 34 can include a bit string of length M, comprising bit-values "0" (logical low) and "1" (logical high), with only a single "1" (logical high). This typically corresponds to one-hot encoding of the quantized information that has come from the input frame 33 through the partitioning and quantization step in the input unit 34. Based on the block-level input 350, there are two derivative representations of this block-level input 350:

1. Extended: This is the replication of the block-level input L times, thus building an MxL-long bit string, which contains L bits that are equal to "1" (logical high). Example: In case M=4 and L=2 and a block-level input equal to [0 0 0 1], the extended representation is equal to [0 0 0 1 0 0 0 1].
2. Winning: This representation is a MxL bit string. It stems from the extended one (as described above), with the difference that also in the final bit string only one bit is equal to "1" (logical high). This is typically called a winning bit, since it is the only one retained from the other "1" (logical high) bits of the extended representation. Example: Picking up the previous example, there are two possible winning representations: [0 0 0 1 0 0 0 0] and [0 0 0 0 0 0 0 1].

In embodiments of the disclosed technology, for instance the embodiment illustrated with respect to FIG. 4, the column addressing unit 41 is adapted for receiving the partitioned and quantized representation of current input data, i.e. the M-bits block-level input 350, and for generating the derivative representation thereof. In alternative embodiments, as for instance illustrated in FIG. 9, the columns addressing unit 41 may be adapted for receiving such derivative representation from a block-level input unit 91. In such cases, the block-level input unit 91 is adapted for receiving the partitioned and quantized representation of current input data, i.e. the M-bits block-level input 350, and for generating the derivative representation thereof. The block-level input unit 91 together with the input unit 34 may form an input system 340 for receiving an input frame as input and creating a representation for that input, which is fit for memory cell addressing in the at least one array.

In embodiments of the disclosed technology, the column addressing unit 41 is adapted for applying the MxL-bit long derivative representation of current input data as a column address to the array 360 of memory cells 40.

The row addressing unit 42 is adapted for receiving the representation of input data from a frame at a specified time in the past, and for applying this representation of past input data as a row address to the array 360 of memory cells 40. The representation of the past input data may preferably be a winning representation, i.e. with only one "1" (logically high).

Still referring to the block 30, a reading unit 43 is provided for buffering scalar values read from specific memory cells 40, more particularly from memory cell elements, in the array 360, based on the row and column addresses applied. More particularly, those memory cells 40 will be read for which both the column address and the row address exhibits a "1" simultaneously. Each read scalar value corresponds to a likelihood of temporal coincidence between the input representation of the row address and the input representation of the column address, or in other words: the scalar value expresses the likelihood of temporal coincidence between the currently and previously observed frame (more particularly the part thereof dealt with by the block under consideration).

A comparison unit (not illustrated), which may be part of the reading unit 43 or which may be a separate element, is provided for testing the scalar values buffered in the reading unit 43 for a specific criterion. The comparison unit identifies a single scalar value amongst the scalar values buffered in the reading unit which fits the specific criterion the most, or a limited number of scalar values amongst the scalar values buffered in the reading unit which fit the specific criterion. The corresponding address of the memory cell 40 storing the scalar value which fits the specific criterion most, or of all the memory cells 40 storing a scalar value which fit the specific criterion, is stored for being applied in a next sequence to the row addressing unit 42. Most convenient is the implementation where the comparison unit only identifies a single scalar value which fits the criterion most.

Figure 9:
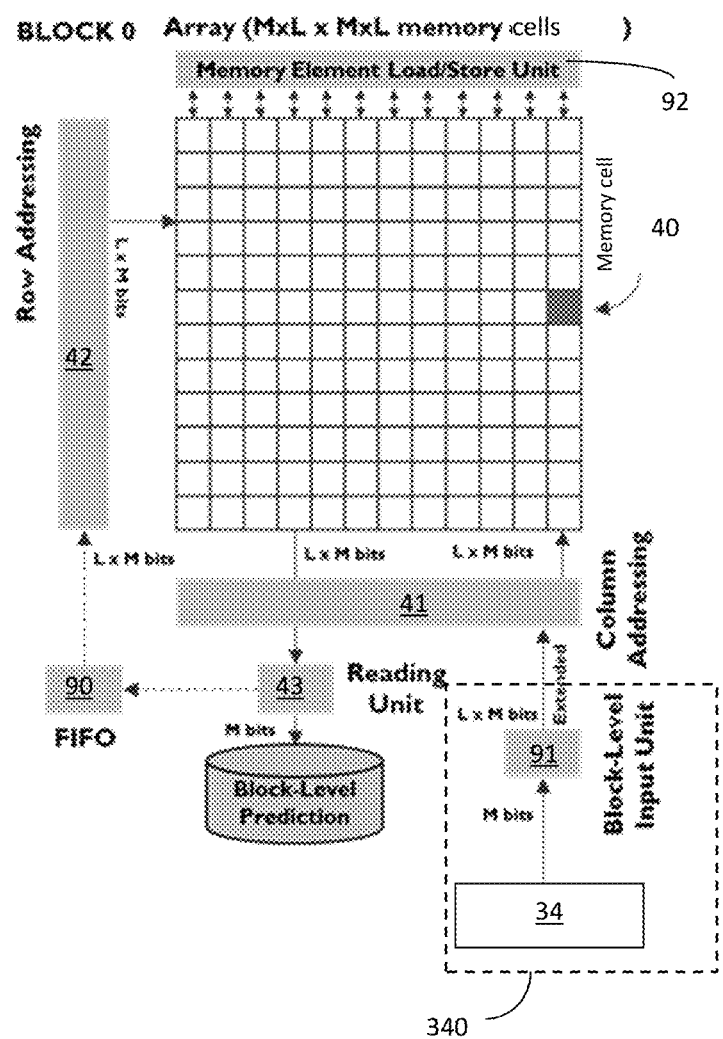
FIG. 9 schematically illustrates a more elaborated implementation of a building block of a temporal memory system according to embodiments of the disclosed technology.

Depending on the delay k between the current frame N and the previous frame N−k, k>0, the storage of the address of the memory cell 40 storing the scalar value which fits the specific criterion most may be directly in a shifting unit, for instance FIFO 90, as illustrated in FIG. 9, or in a buffering unit, which may be part of the FIFO 90. The buffering unit is nothing more than a delay element. The level of the delay is determined at the start of the process, and remains constant throughout the process. If k>1, k−1 addresses may be stored in the buffering unit, in a FIFO manner. After a block input is processed, the shifting unit enqueues a row address to the FIFO. If k=1, no intermediate buffering unit is required, and the address of the memory cell 40 storing the scalar value which fits the specific criterion most, or of the scalar values may be directly fed to the shifting unit for populating the row addressing unit 42.

Operational Description

A temporal memory system 10 according to embodiments of the disclosed technology, as illustrated in general in FIG. 1, comprises at least one array 360, 361, 362 having (M×L)× (M×L) memory cells (MxL columns and MxL rows), as illustrated in more detail in FIG. 3. The operational principle is explained in more detail hereinafter for a single block, as all blocks perform their functions independently of all other blocks.

The addressing of memory cells 40 in the array 360 is such that a previous frame (not necessarily immediately preceding the current frame, but may do so) addresses the rows of the array, and a current frame addresses the columns. This means that in accordance with embodiments of the disclosed technology, a state is applied based on a previous state, optionally with some further delay being included. Hence, in the array, a representation of input data from a frame of the data stream at a specified time in the past (frame N-k), present in the row addressing unit 42, is presented at the rows of the array 360.

Figure 5:
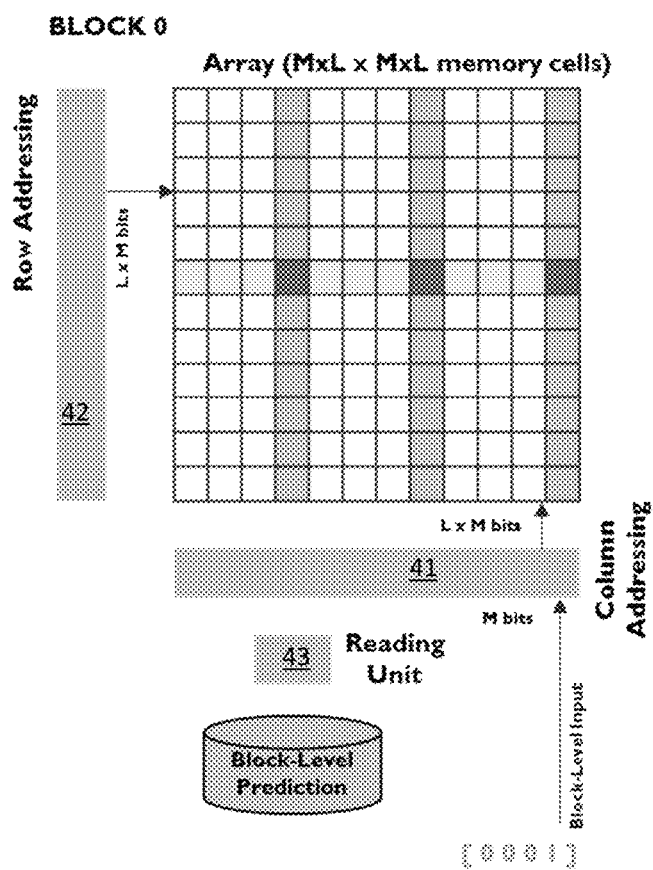
FIG. 5 to FIG. 8 illustrate operational details of the building block illustrated in FIG. 4, in different situations.

At the start, M-bit long block-level input is provided at the input of a block 30, 31, 32, and from the M-bit long block-level input, a derivative MxL-bit representation, either extended or winning, is generated. This derivative representation is applied as a column address to the columns of the memory cell array 360 by the column addressing unit 41. The derivative representation is used as a mask, to only enable the respective columns. A winning representation (corresponding to a previous frame in time) is applied by the row addressing unit 42 to the rows of the memory cell array 360, thus enabling a single row. This results to the identification of a certain amount of intersecting cells, as illustrated in FIG. 5. At this point, it needs to be identified whether the current frame (represented by the column addressing mask) is temporally correlated to the previous frame (represented by the row addressing). This is done by checking the readout value of all cells in the activated row, and by testing these for a specific criterion, for instance maximum current flowing through one of them, current flowing through cells being larger than a predetermined threshold, minimal resistance of one of the memory cells, resistance of memory cells being below a predetermined threshold, maximal voltage over one of the memory cells, voltage over memory cells being larger than a predetermined threshold, etc. This way, amongst all connections made, the memory cell 40 that fits the criterion most is identified, or the plurality of memory cells that fit the criterion are identified. If, however, a threshold for finding the fit is not reached, no identification is done.

For the case of the OXRAM, this operation can be implemented as follows: All '0' bits correspond to $V_{in}$=0V at the input, all '1' bits correspond to $V_{in}=V_{read}$ at the input. A representation of a current frame of the data stream (frame N), present in the column addressing unit 41, is presented at the columns of the array 11. All '0' bits correspond to $V_G$=0V at the input, all '1' bits correspond to $V_G=V_{G,CC}$ at the input. The gate voltage $V_{G,CC}$ is the gate compliance voltage, which is the voltage applied or sufficient to open all gates at the selected line and limit the current to a predefined maximum compliance current (=CC). The choice of the gate compliance current depends on the read sensitivity and speed as well as the power constriction. Also the choice of the type of memory cell element, e.g. the type of RRAM technology, can determine an appropriate compliance current. For instance for filamentary RRAM with oxygen vacancies, $V_{G,CC}$ can be selected 25 µA. The output lines are all at $V_{out}$=0V.

Figure 6:
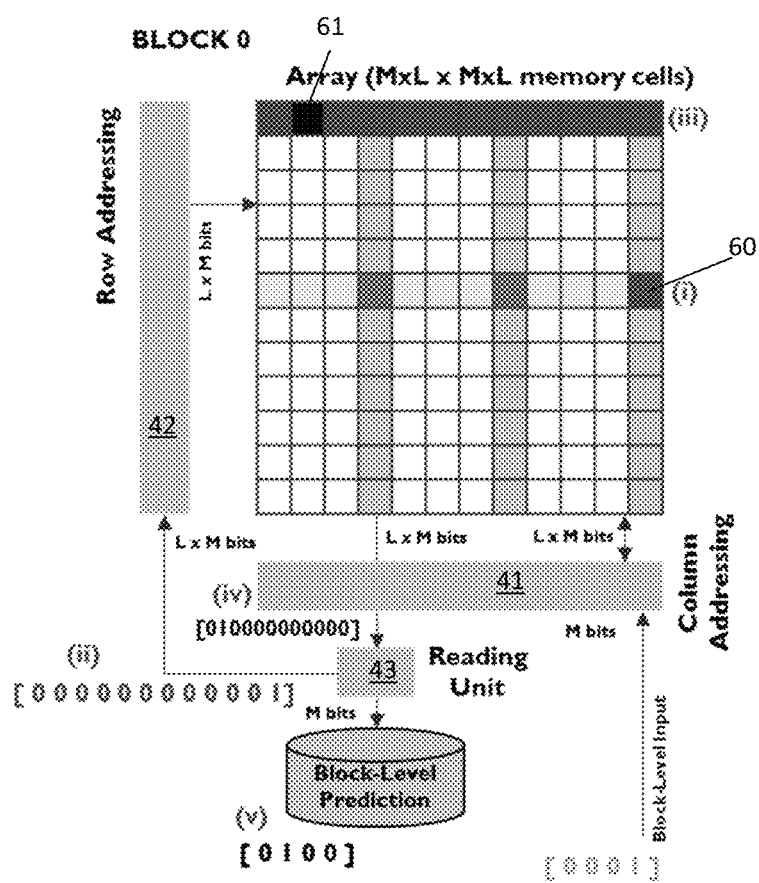
Figure 7:
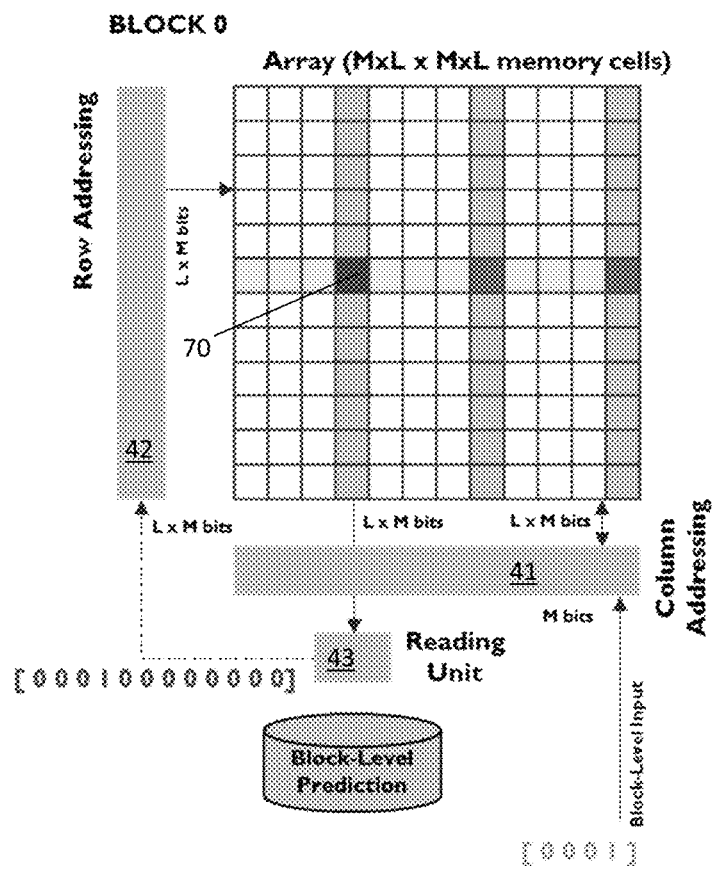
Figure 8:
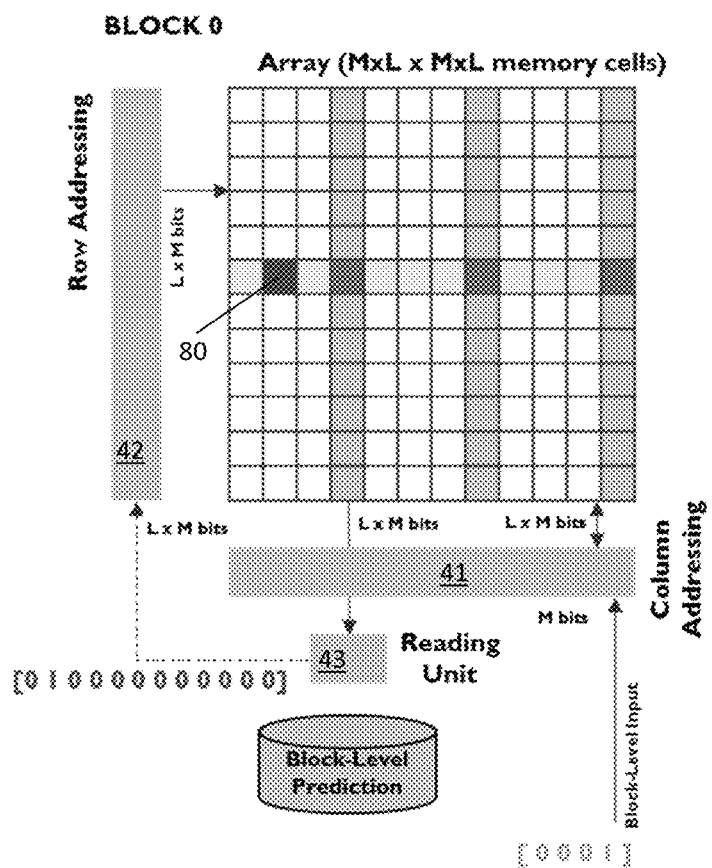

Regardless of the implementation of the memory elements (OXRAM, CBRAM, VMCO, etc.), there exist the following distinct possibilities at the current stage of temporal memory operation, as illustrated in FIGS. 6 to 8.

Possibilities

The criterion is met, e.g. the lowest resistance is returned, by one of the intersecting cells 60, thus indicating a match. In such a case, as illustrated in FIG. 6, the reading unit 43, e.g. the selection unit, creates a winning representation based on the cell 60 that has the dominant readout (i). The scalar value stored in the cell 60, e.g. the connection strength of this cell 60, may be additionally incremented (an increment operation may be applied) in order to amplify the associated temporal memory. In order to produce a prediction, the winning representation created previously is passed (ii) to the row addressing unit 42, thus enabling (iii) a single row, which is the top row in the example illustrated. The cell with dominant readout value from the latter row (indicated as the cell 61 in FIG. 6) leads to a new winning representation (iv). By keeping the primitive bits of the winning representation (i.e. discard the extensions that are equal to zero), a prediction is obtained translated to the format of the block-level input (v).

None of cells in the enabled row indicate an active connection to the selected columns, hence none of the cells fit the criterion (for instance readout of all cells in the row is at high resistive state, or at a resistive state higher than a predetermined threshold). This is an anomaly and no prediction can be produced. At this point, there are two possible courses of action:

a. One of the intersecting cells is chosen (at random) and an increment operation is applied. In some embodiments, such increment operation implies that the scalar value stored in that cell is incremented, for instance the cell is set (i.e. the respective connection is strengthened). However, if the maximum value of a scalar value in that particular cell is already reached, the increment operation, although applied, does not effectively change the scalar value. In the example illustrated in FIG. 7, the cell that is randomly forced to become winning is indicated by reference 70. The randomly picked cell 70 leads to a winning representation (only one bit equal to "1"). This representation is created by the reading unit 43 and will be used a later time in the row addressing unit 42, to enable the respective row. The "future" use of the winning representation at this stage is indicated by a dashed arrow in FIG. 7.

b. It is possible to check the rest of the cells in the currently enabled row (apart from the intersecting ones, to search for an existing connection).

i. In case, such a connection exists, the winning cell 80 of the enabled row does not belong to the input context (i.e. intersecting cells between row and enabled columns). This means that the block-level input has arrived in an unpreceded sequence. This winning cell may be forwarded to the column addressing unit, while a temporal anomaly is signalled.

ii. In case no active connection exists in the currently enabled row (either in the intersecting cells or the rest of the cells of the row), one of the intersecting cells is randomly picked and set according to the procedure outlined in possibility 2a and FIG. 7.

In particular circumstances, it may be desired to weaken the connection strengths that have been developed in the temporal memory arrays. This may, for instance, be the case when older connections learnt in the past is presently intended to be forgotten and replaced by newly learnt patterns, or when certain amount of connections were made unintentionally, e.g., not caused by actual data but caused by noise, and therefore may desired to be forgotten. Weakening of connection strengths may be performed, for instance, by, among the cells of an enabled row, weakening all connections except for the cell that belongs to the winning column. This weakening of temporal memories (i.e. connections stored in the array) can be done by appropriately changing the scalar value that is stored in the respective memory cells (i.e. by incrementing or decrementing). In particular, this delearning step can be combined with the reading of the selected row. This means that the condition used to read the selected cells is chosen such that all cells are delearned (e.g., connection strengths are weakened).

In particular circumstances, it may be desired to rapidly store or load the scalar values that are contained in the memory elements of the at least one array of the temporal memory. For that purpose, the temporal memory system disclosed herein is optionally composed of a memory element load/store unit, which is used to implement this operation, as illustrated in FIG. 9—annotation 92. The storing can be facilitated by reading all memory cells of the at least one array and storing them in a dedicated load/store unit. The loading (e.g. when excessive training times may to be avoided) is the inverse procedure, whereby the load/store unit loads the desired connection strengths from an outside storage medium (e.g. optical, magnetic, or solid state) to the memory cells of the at least one temporal memory arrays.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A hardware implementation of a temporal memory system, comprising:

at least one array of memory cells logically organized in rows and columns, wherein each of the memory cells is adapted for storing a scalar value and adapted for changing the stored scalar value;

an input system adapted for receiving an input frame as input and creating a representation for the input, wherein the input comprises information for addressing the memory cells in the at least one array of memory cells;

at least one addressing unit for identifying a memory cell in the at least one array of memory cells with a row address and a column address, the at least one addressing unit comprising:

a column addressing unit for receiving the representation or a derivative thereof as input and applying the representation or the derivative as a column address to the at least one array of memory cells, and a row addressing unit for receiving a delayed version of the representation at a specified time in the past as input, and applying the delayed version of the representation as a row address to the at least one array of memory cells; and a reading unit adapted for reading out scalar values from a selected row of memory cells in the at least one array of memory cells, based on the row address applied, wherein each scalar values read out by the reading unit corresponds to a likelihood of temporal coincidence between the input representation of the row address and the input representation of the column address, the likelihood being adjustable through the scalar value stored in the memory cell.

2. The hardware implementation according to claim 1, wherein the specified time in the past corresponds to a predetermined number of frames before a current input frame, wherein the hardware implementation furthermore comprises a buffering unit for implementing a first-in-first-out (FIFO) queue with a pre-determined depth for storing a given number of derivative representations of previous input frames.

3. The hardware implementation according to claim 2, wherein the first-in-first-out (FIFO) queue furthermore comprises a shifting unit adapted for enqueuing a row address to the FIFO queue.

4. The hardware implementation according to claim 1, wherein the reading unit comprises a selection unit for selecting the scalar value based on a criterion and corresponding addresses of the scalar value.

5. The hardware implementation according to claim 1, wherein the at least one array of memory cells is a square array comprising equal numbers of rows and columns.

6. The hardware implementation according to claim 1, wherein the memory cells are adapted for supporting three operations including reading the scalar value, incrementing the scalar value and decrementing the scalar value.

7. The hardware implementation according to claim 6, wherein the addressing unit is adapted for identifying one or more memory cells in the at least one array of memory cells prior to implementing any of the three operations.

8. The hardware implementation according to claim 1, wherein the input system comprises a block-level input unit adapted for receiving a partitioned input from an input unit, and for transforming the partitioned input into a representation fit for memory cell addressing in the at least one array of memory cells.

9. The hardware implementation according to claim 1, wherein the memory cells include non-volatile memory cells.

10. The hardware implementation according to claim 1, wherein the memory cells include one or more of resistive random-access memory (RRAM) cells, oxide-based random-access memory (OXRAM) cells, conductive bridging random-access memory (CBRAM) cells, vacancy-modulated conductive oxide random-access memory (VMCO) cells, phase-change memory (PCM) cells, programmable metallization (PMC) cells, static random-access memory (SRAM) cells, flash cells, floating gate cells, magnetic random-access memory (MRAM) cells, spin-transfer torque (STT) MRAM cells, and spin orbit torque (SOT) MRAM cells.

11. The hardware implementation according to claim 1, wherein the memory cells include volatile memory cells.

12. The hardware implementation according to claim 11, wherein the memory cells include one or both silicon-oxide-nitride-oxide-silicon (SONOS) cells and dynamic random access memory (DRAM) cells.

13. The hardware implementation according to claim 1, wherein each of the memory cells comprises a single selector and a single storage element.

* * * * *